United States Patent [19] [11] Patent Number: 4,943,850
Asaida [45] Date of Patent: Jul. 24, 1990

[54] APPARATUS FOR LIMITING THE OUTPUT SIGNAL FREQUENCY BAND OF AN OPTICAL SENSOR

[75] Inventor: Takashi Asaida, Kanagawa, Japan

[73] Assignee: Sony Corporation, Tokyo, Japan

[21] Appl. No.: 256,558

[22] Filed: Oct. 12, 1988

[30] Foreign Application Priority Data

Oct. 23, 1987 [JP] Japan .................... 62-267860

[51] Int. Cl.⁵ .............................. H04N 9/097
[52] U.S. Cl. ............................ 358/55; 358/50; 358/38
[58] Field of Search ............... 358/41, 50, 38, 55

[56] References Cited

U.S. PATENT DOCUMENTS 4,599,640  7/1986  Dischert ................. 358/50
4,663,661  5/1987  Weldy et al. ............ 358/44

Primary Examiner—James J. Groody
Assistant Examiner—Robert M. Bauer
Attorney, Agent, or Firm—Lewis H. Eslinger; Jay H. Maioli

[57] ABSTRACT

A digital video color camera having three solid-state image sensing devices and an analog-to-digital converter that converts the signal from the image sensing devices to a digital signal and a digital signal processing circuit that processes the output of the analog-to-digital converter further includes a clock generator that generates a first sampling clock signal used to drive the solid-state image sensing devices and a second clock signal having a frequency (f2) that is higher than the first frequency (f1) used to drive the digital signal processing circuit. An optical low-pass filter and an electrical low-pass filter are provided between the image sensing devices and the analog-to-digital converter in one embodiment, and in another embodiment the electrical low-pass filter is after the analog-to-digital converter. The optical low-pass filter has a frequency characteristic chosen to depress the frequency band component between the frequencies f1−½f2 and f1. The electrical low-pass filter, on the other hand, is chosen to have a frequency characteristic to depress a frequency band component higher than the frequency ½f2.

10 Claims, 7 Drawing Sheets

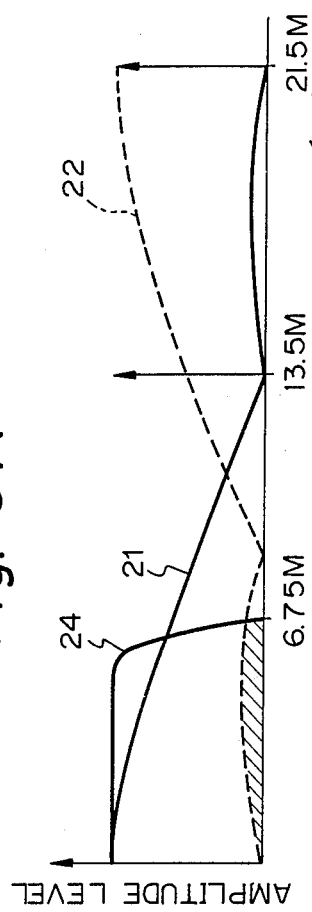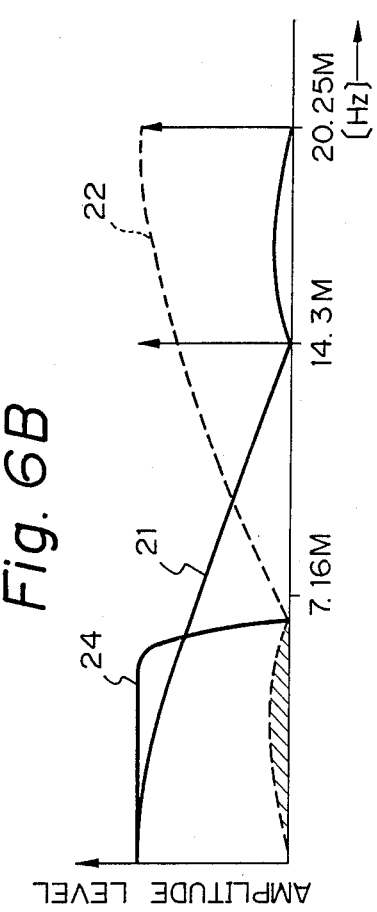

APPARATUS FOR LIMITING THE OUTPUT SIGNAL FREQUENCY BAND OF AN OPTICAL SENSOR

BACKGROUND OF THE INVENTION

1. Field of the Invention

This invention relates generally to a video camera having a solid-state optical sensor and, more particularly, to a digital signal processing circuit by which the camera output signal frequency band is limited.

2. Description of the Background

In a known color video camera having three solid-state image transducing devices, the image of an object that falls on the solid state image transducing device for generating the green color signal is typically displaced in the horizontal direction. Such displacement is generally one-half the alignment pitch of the picture elements relative to the image of the object that is projected on the solid-state image transducing devices for generating the red and blue signals. This displacement of the green transducing device is provided in order to increase the resolution of the video camera and this technique is generally referred to as "special offset" or "special displacement". Solid-state television cameras employing this technique are shown in U.S. Pat. Nos. 3,975,760 and 4,672,430, both of which are assigned to the assignee hereof.

FIG. 1 represents the frequency spectrum of the output signal obtained using the conventional solid-state camera in which the "special offset" or "special displacement" technique is employed. The most widely used image sensing element for the solid-state camera is the charge coupled device (CCD). In FIG. 1, f1 represents the sampling frequency of the CCD and, as described in U.S. Pat. No. 3,975,760, an output signal of the CCD is provided to an optical low-pass filter to limit the frequency band of such output signal.

Referring to FIG. 1, a baseband component of the output signal of the solid-state image sensing device is represented by solid line 31, a primary sideband component of the green signal is represented by broken line 32G, and primary sideband components of the red and blue signals are represented by the same broken line 32RB. In this case, the generation of so-called aliasing noise caused by the sideband components is prevented because the phase of the green signal and the phase of the red and blue signals are opposite each other and, thus, the aliasing noises offset each other. On the other hand, in the case of a digital video camera or a monochromatic or color image processing apparatus in which digital signal processing is employed, in-phase or so-called "same phase" sampling is mainly used because the application of the "special offset" or "special displacement technique" is difficult.

FIG. 2 represents a case of the in-phase or same phase sampling and because the sideband component shown by broken line 33 has the same phase as the output signals of the three solid-state image transducing devices, the sideband component 33 will extend into the baseband signal shown by solid line 31. This extension or overlapping between the sideband component and the baseband signal will produce an aliasing noise shown as the slanted line shaded portion in FIG. 2.

In order to overcome this aliasing noise problem, the use of an optical low-pass filter is known in conventional systems to depress a high-frequency component of the baseband component as shown by solid line 34A in FIG. 3A. Such optical low pass filter can prevent the generation of the aliasing noise because the frequency band component of the sideband component from 0 to ½ f1 is depressed, as shown by the broken line 34B in FIG. 3A. In the case of digital signal processing, a low-pass filter known as a pre-filter that has a frequency characteristic, as shown by the solid line 35 in FIG. 3B may be used to limit the frequency band of the baseband signal.

Although the optical low-pass filter as described above, which has a frequency characteristic generally as in FIG. 3A, can adequately prevent generation of the aliasing noise, there is the disadvantage that the modulation transfer function (MTF) at the high-frequency band may deteriorate due to attenuation of the high-frequency band having an effective frequency from 0 to ½ f1, because such optical low-pass filters generally do not have a sharp cutoff characteristic. The modulation transfer function is known in solid-state or diode type video cameras as the modulus of the optical transfer function and is generally synonymous with the sine amplitude response.

OBJECTS AND SUMMARY OF THE INVENTION

Accordingly, it is an object of the present invention to provide a signal processing apparatus for a digital camera having a solid-state imaging device that can eliminate the above-noted defects inherent in the prior art.

Another object of this invention is to provide a signal processing apparatus for a solid-state video camera that is capable of satisfactorily depressing aliasing noise that is included in the digital signal.

A further object of this invention is to provide a processing apparatus for a solid-state video camera that can improve the modulation transfer function characteristic at the high-frequency band.

In accordance with an aspect of the present invention, the above objects are accomplished by providing a signal processing apparatus for use with a video camera that includes at least one solid-state image sensing device, a first clock generator that generates a sampling clock signal having a frequency f1 that is used to drive the solid-state image sensing device, an optical low-pass filter, a pre-signal processing circuit that includes an electrical low-pass filter and an analog-to-digital converter, and a main signal processing system connected to the pre-signal processing circuit. This apparatus is characterized in that the frequency f1 is selected higher than the frequency f2 so that the optical low-pass filter depresses a frequency component band of f1-½ f2 to f1 of the image signal, and the electrical low-pass filter depresses the frequency component band which is higher than ½ f2.

The above and other objects, features, and advantages of the present invention will become apparent from the following detailed description of illustrative embodiments thereof to be read in conjunction with the accompanying drawings in which like reference numerals represent the same or similar elements.

BRIEF DESCRIPTION OF THE DRAWINGS

FIGS. 6A–6D are graphical representations of respective frequency spectrums when the frequency of the pulse signal is varied;

DETAILED DESCRIPTION OF PREFERRED EMBODIMENTS

Figure 1:
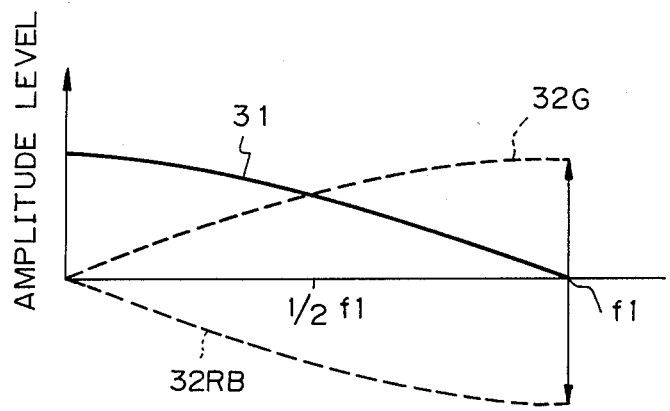
FIG. 1 is a graphical representation of a frequency spectrum obtained by the special offset technique known in the prior art.
Figure 2:
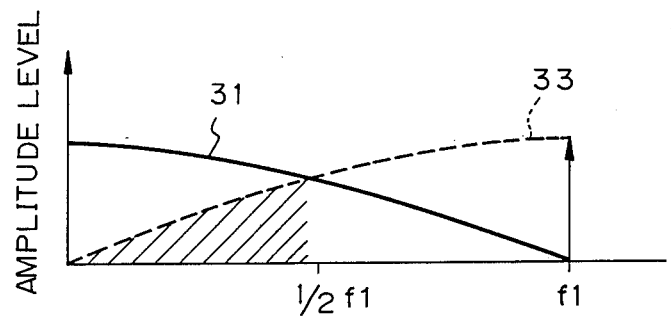
FIG. 2 is a graphical representation of the frequency spectrum obtained by using the same phase sampling technique known in the prior art.
Figure 3A:
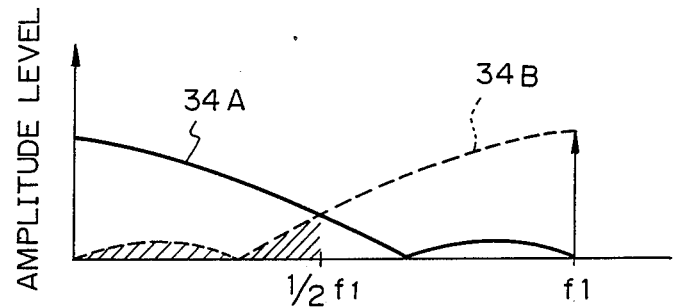
FIGS. 3A and 3B are graphical representations of another frequency spectrum obtained by an improved optical low-pass filter known in the prior art.
Figure 3B:
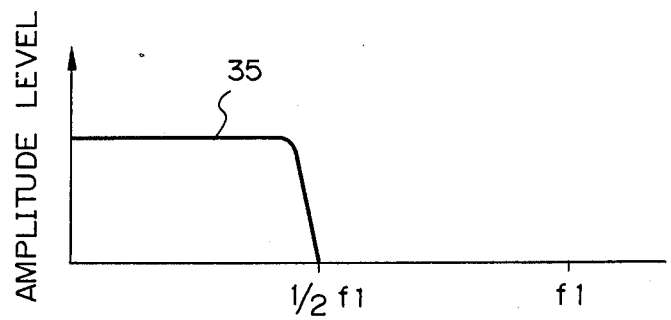
Figure 4:
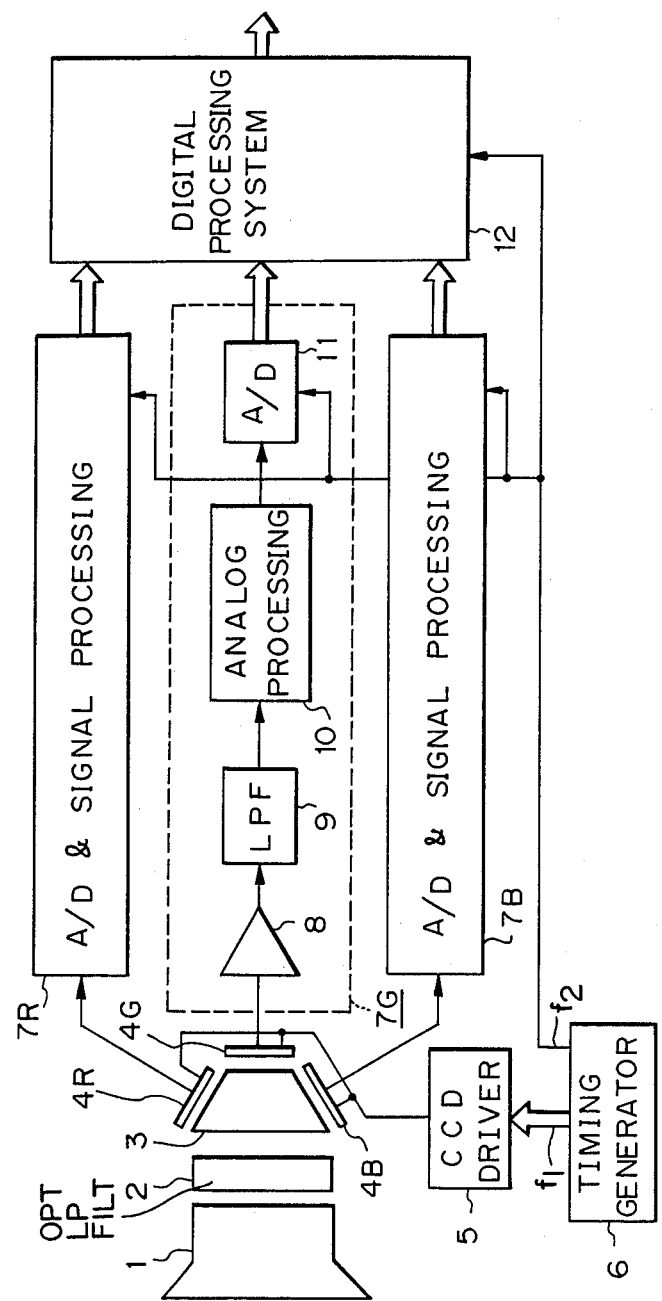
FIG. 4 is a schematic in block diagram form of signal processing apparatus according to an embodiment of the present invention.

FIG. 4 schematically represents an embodiment of the present invention for use with a solid-state video camera that includes a lens 1, an optical low-pass filter 2, and a dichroic mirror prism 3. The optical image obtained by lens 1 and passed through optical low-pass filter 2 is divided into three elementary color signals, red, green, and blue by dichroic mirror prism 3. Three CCD chips 4R, 4G, and 4B are provided to receive each elementary color signal. A clock signal having a frequency f1, which may be for example 20.25 MHz, for driving the three CCD chips 4R, 4G, and 4B is provided by a CCD driver unit 5. CCD driver unit 5 generates the clock signal based upon the output signal of a timing generator 6. An analog-to-digital converter and signal processing unit 7R is connected to the output of the red CCD chip 4R, an analog-to-digital converter and signal processing unit 7G is connected to the output of the green CCD chip 4G, and an analog-to-digital converter and signal processing unit 7B is connected to the output of the blue CCD chip 4B. Each of these analog-to-digital converter and signal processing units is identical and, thus, only one is shown in detail in FIG. 4.

In the embodiment of FIG. 4, the output signal of the CCD image detector 4G, for example, is fed to a preamplifier 8 whose output is fed through a low-pass filter 9 to an analog signal processing circuit 10. Analog signal processing circuit 10 is constructed to generally include a gain control circuit and a so-called pre-knee circuit. As is known, a knee circuit is a circuit that is nonlinear over its entire range and is generally provided to achieve proper circuit response within a fixed operating range. In this case, knee is used in the sense that it is the curve that joins two relatively straight portions of a characteristic curve, that is, rather than a straight linear response, the characteristic curve has a so-called knee. This circuit in the analog processing circuit is called a pre-knee circuit, because later in the circuitry the actual knee circuit is typically provided. The output of analog signal processing circuit 10 is fed to an analog-to-digital converter 11 with the subsequent parallel digital signal being fed to a digital processing system 12. The other color signals that are fed through analog-to-digital converter and signal processing units 7R and 7B, respectively are also fed to digital processing system 12. Digital processing system 12 includes typically a gamma-convergence circuit, an image enhancing circuit, and an encoder. In addition, as pointed out, a knee circuit in which having nonlinear characteristics is also typically employed therein. A digital video tape recorder or a digital switching circuit of the kind that provides so-called special effects such as the simultaneous display of two different pictures, may also sometimes be included in digital processing system 12.

Timing generator 6 in addition to producing the driving signal for CCD driver 5 also provides a sampling clock signal having a frequency f2, which may be for example 13.5 MHz, to the analog-to-digital converter 11. This sampling clock signal f2 is also fed to the digital processing system 12.

Low-pass filter 9 is chosen to have a cut-off frequency of f2/2, so that low-pass filter 9 passes a signal having a frequency within the band of 0 to f2/2. Optical low-pass filter 2 has a frequency characteristic that passes signals within a frequency band of from 0 to f2 and depresses, at least to some extent, a signal having a frequency component higher than f2, as shown by the solid line 21 in FIG. 5. The sampling frequency f1 of the CCD chip is chosen as 1.5 f2, that is, a frequency of 20.25 MHz. A sideband component of the output signal of analog-to-digital converter 11 has a frequency spectrum shown by the broken line 22 in FIG. 5 and, thus, a frequency component shown at 23 in FIG. 5 that could cause the aliasing noise is substantially depressed. Moreover, because the frequency characteristic of optical low-pass filter 2, which is shown by solid line 21 in FIG. 5, does not attenuate the high-frequency component within the effective frequency band, the modulation transfer function characteristic at the high-frequency band can be satisfactorily maintained.

Figure 5:
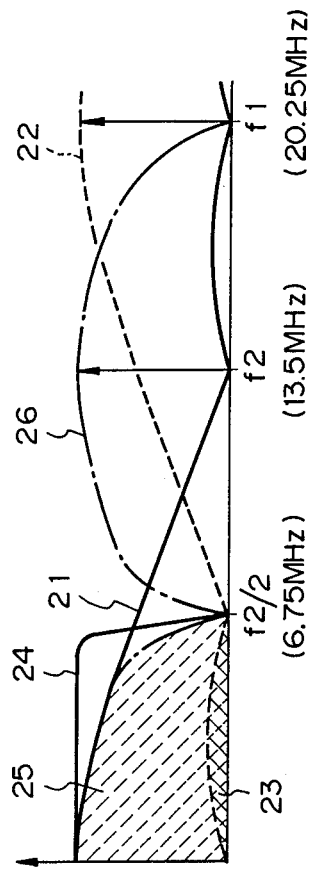
FIG. 5 is a graphical representation of the frequency spectrum of an image signal and a digitized image signal based upon pulse signals derived from the system of FIG. 4.

Low-pass filter 9 is chosen to have a sharp roll-off characteristic in order to prevent generation of the aliasing noise caused by the analog-to-digital conversion, because it is not possible to construct an optical low-pass filter that can have a sharp roll-off characteristic. Because low-pass filter 9 has a low-pass characteristic shown by solid line 24 in FIG. 5, the frequency band of the image signal is limited from 0 to f2/2. A baseband component of the image signal shown by the shaded area 25 in FIG. 5 is converted to digital form by analog-to-digital converter 11 using the sampling clock signal having a frequency of f2, that is, 13.5 MHz. As shown by the single dot and dash line 26 of FIG. 5, a sideband component is generated by analog-to-digital converter 11 that exists outside of the effective bandwidth area, as shown by the shaded portion 25. Therefore, aliasing noise due to this sideband does not appear in the output signal.

Figure 6C:
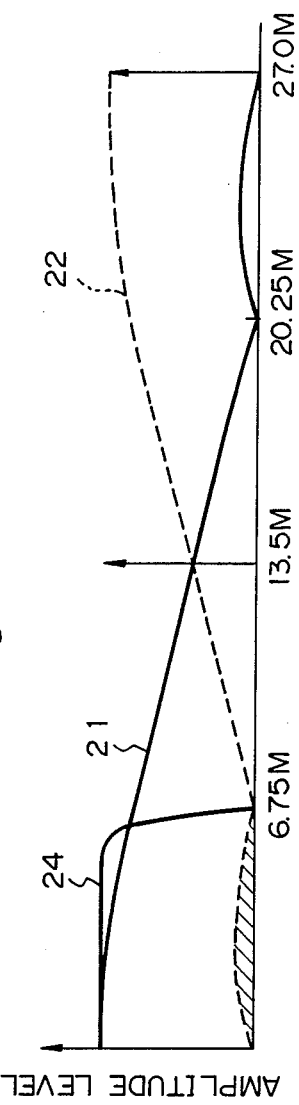
Figure 6D:
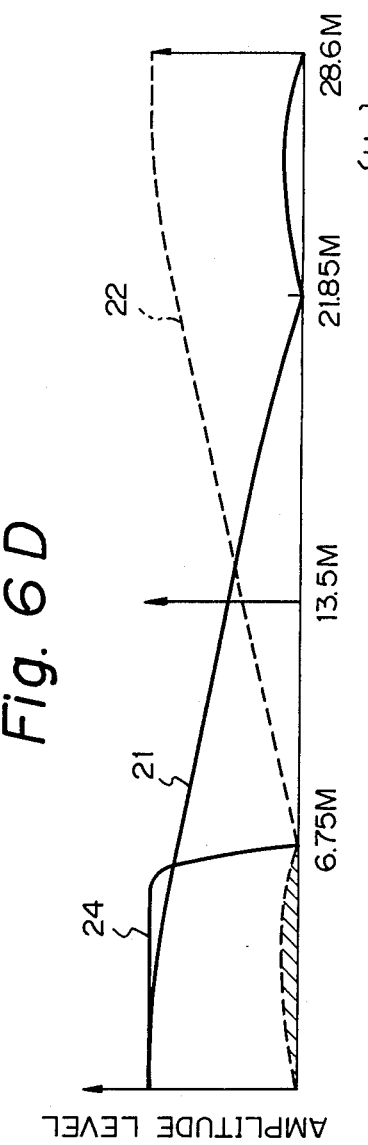

Other examples showing the relationship between the CCD sampling frequency f1 and the analog-to-digital conversion sampling frequency f2 are shown in FIGS. 6A–6D. Referring to FIG. 6D, an example is presented in which sampling frequency f1 is 21.5 MHz so that f1 is equal to six $f_c$, which is the color subcarrier frequency, and f2 is 13.5 MHz. Similarly, in FIG. 6B, the CCD frequency f1 is 20.25 MHz and the analog-to-digital conversion frequency is 14.32 MHz, which is equal to 4 fsc. In FIG. 6C, the CCD frequency is chosen as 27 MHz whereas the analog-to-digital conversion frequency is 13.5 MHz. In FIG. 6D the CCD frequency f1 is chosen as 28.6 MHz, which is equal to 8 times the sub-carrier frequency fsc, and the analog-to-digital conversion frequency is 13.5 MHz. As may be understood from the examples presented in FIGS. 6A-6D, the CCD sampling frequency f1 is chosen to be approximately ½ times the analog-to-digital conversion sampling frequency f2, so that the frequency characteristic 21 of the optical low-pass filter can effectively depress the component having the frequency band from f1−f2/2 to f1+f2/2.

Figure 7:
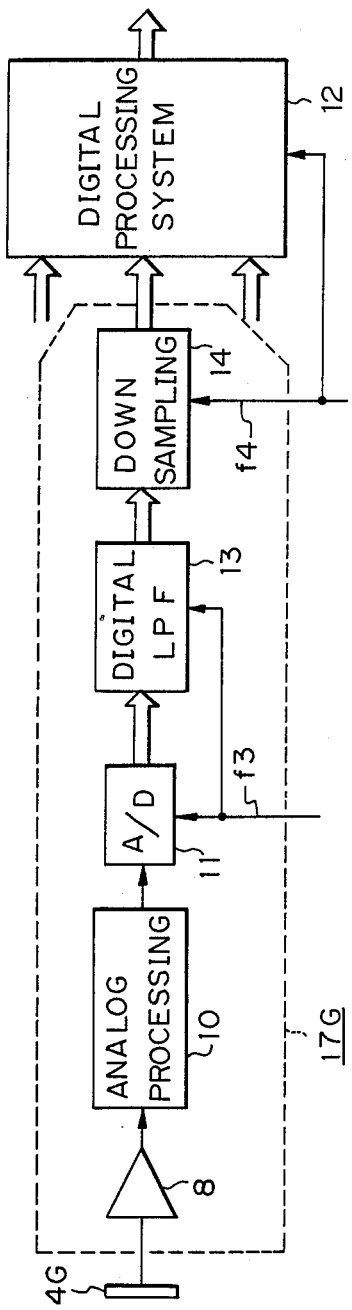
FIG. 7 is a schematic in block diagram form of another embodiment of the digital signal processing apparatus according to the present invention.

FIG. 7 is another embodiment of a digital signal processing system according to the present invention in which only one so-called channel is shown. As in FIG. 4 the output of the green CCD element for 4G is fed through pre-amplifier 8 and through analog processing circuit 10 to analog-to-digital converter 11. Note that analog low-pass filter 9 is omitted. In this embodiment, however, the digital output of analog-to-digital converter 11 is fed to a digital low-pass filter 13 that acts to restrict the frequency band of the output signal of analog-to-digital converter 11. The output signal of digital low-pass filter 13 is then fed to a down sampling circuit 14, whose output signal is fed to digital processing system 12. The other two channels that correspond to the red signal and the blue signal also produce digital outputs fed to digital processing system 12. These channels are identical to that shown in FIG. 7 and are not shown in the interest of clarity. A clock signal with frequency f3 is fed to analog-to-digital converter 11 and to digital low-pass filter 13. Another clock signal having a frequency f4 is fed to down sampling circuit 14 and to digital processing system 12.

Down sampling circuit 14 is a sampling rate conversion circuit that operates so that a digital image signal having a sampling frequency of f3, for example, which is higher than f4, is converted to a digital image signal having a sampling frequency of f4. The CCD sampling frequency of f1 is determined to be n X f4 (where n is an integer), and f1 is equal to f3. For example, f1=f3=27 MHz, and f4=13 MHz.

Figure 8A:
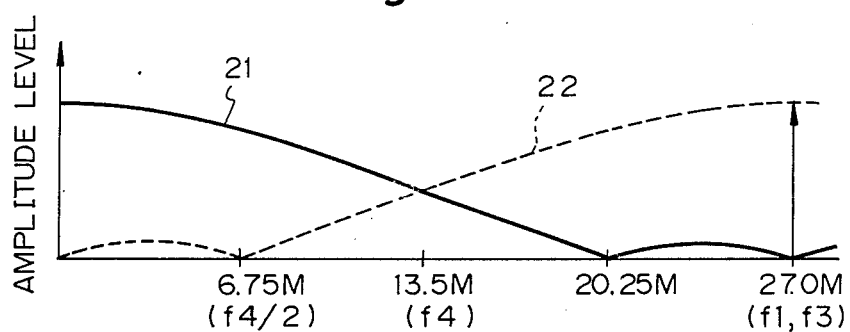
FIGS. 8A–8C are graphical representations of the frequency spectrum obtained using the embodiment of FIG. 7.
Figure 8B:
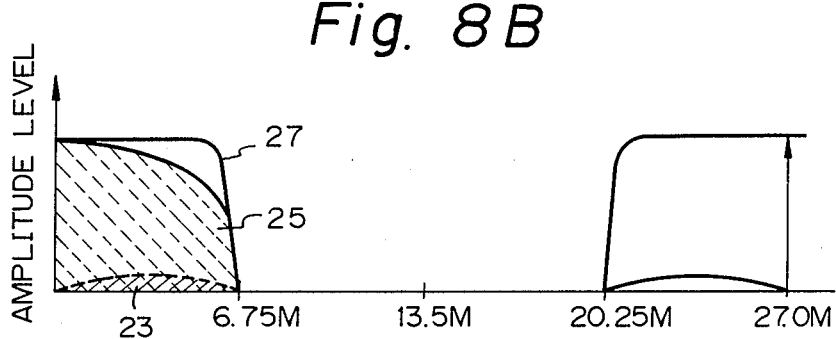
Figure 8C:
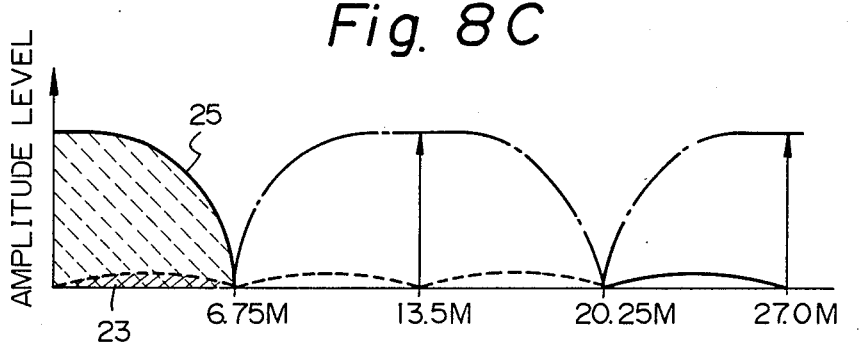

FIGS. 8A-8C represent the frequency spectrums obtained using the embodiment of FIG. 7. More specifically, in FIG. 8A, the frequency characteristic of the optical low-pass filter is again shown at 21 and the sideband component is shown by the dashed line 22. Just as in the embodiment of FIG. 4, the optical low-pass filter depresses the component having a frequency band from f1−½ f4 to f1+½ f4 quite effectively. In FIG. 8B, it is seen that the low-pass characteristic of the digital low-pass filter 13 is represented by solid line 27. Because f1=f3=27 MHz, the folded distortion component 23 that might be derived from the baseband area 25 is depressed sufficiently. Because a digital signal having the spectrum as shown in FIG. 8B is provided to down sampling circuit 14, a digital image signal having a spectrum as represented in FIG. 8C is produced by down sampling circuit 14. This digital image signal as obtained from down sampling circuit 14 does not include the aliasing noise component.

The above description is given on preferred embodiments of the invention, but it will be apparent that many modifications and variations could be effected by one skilled in the art without departing from the spirit or scope of the novel concepts of the invention, which should be determined by the appended claims.

What is claimed is:

1. Apparatus comprising:
    an optical low-pass filter;
    solid-state image sensing means for receiving an image obtained through said optical low-pass filter;
    signal processing means connected to said solid-state image sensing means and including an analog-to-digital converter and an electrical low-pass filter;
    digital signal processing means connected to said signal processing means for digitally processing an image signal output from said signal processing an image signal output from said signal processing means and;
    a pulse signal generator for generating a first pulse signal having a frequency f1 for driving said solid-state image sensing means and a second pulse signal having a frequency f2 for driving said digital signal processing circuit, f1 being greater than f2, and said optical low-pass filter having a frequency characteristic to depress a frequency component of the image signal located between a frequency of f1−½ f2 and the frequency of f1, and said electrical low-pass filter having a frequency characteristic to depress a frequency component of the image signal greater than ½ f2.

2. Apparatus according to claim 1, in which said solid-state image sensing means comprises a plurality of CCD image sensors.

3. Apparatus according to claim 2, in which said electrical low-pass filter is connected to receive an output of said solid-state image sensing means and an output thereof is connected to said analog-to-digital converter, said analog-to-digital converter being driven by the second pulse signal having a frequency f2.

4. Apparatus according to claim 1, in which said analog-to-digital converter is connected to receive an image output signal from said solid-state image sensing means and said electrical low-pass filter comprises a digital low-pass filter receiving an output signal from said analog-to-digital converter, said analog-to-digital converter and said digital low-pass filter being driven by said first pulse signal having a frequency f1 and in which said signal processing means further comprises a down sampling circuit connected to said digital low-pass filter, said down sampling circuit being driven by said second pulse signal for decreasing a sampling rate of an output of said digital low-pass filter.

5. Apparatus according to claim 1, in which f1 is substantially 1.5 times the frequency of f2.

6. Apparatus for use in a color video camera, comprising:
    an optical low-pass filter;
    a solid-state image sensing device receiving an image obtained through said optical low-pass filter and producing an output signal therefrom;
    signal processing means receiving the output signal from said solid-state image sensing device and including an analog-to-digital converter, a digital low-pass filter, and a down sampling circuit connected to said digital low-pass filter;
    a digital signal processing circuit connected to said signal processing means for digitally processing an image signal output therefrom and;
    a pulse signal generator for generating a first pulse signal having a frequency f1 for driving said solid state image sensing device and a second pulse signal having a frequency f2 for driving said down sampling circuit of said digital signal processing circuit for decreasing a sampling rate of an output of said digital low-pass filter, f1 being greater than f2, and said optical low-pass filter having a frequency characteristic to depress a frequency component of the image signal located between a frequency of f1-½ f2 and the frequency of f1, and said electrical low-pass filter having a frequency characteristic to depress a frequency component of the image signal greater than ½ f2.

7. Apparatus according to claim 6, in which said solid-state image sensing device comprises at least 3 CCD image sensors.

8. Apparatus according to claim 6, in which said electrical low-pass filter is connected to said solid-state image sensing device and an output thereof is connected to said analog-to-digital converter, said analog-to-digital converter being driven by said second pulse signal having a frequency f2 from said pulse signal generator.

9. Apparatus according to claim 6, in which said analog-to-digital converter is connected to receive the output signal from said solid state image sensing device, and said digital low-pass filter receives a digital output signal from said analog-to-digital converter, said analog-to-digital converter and said digital low-pass filter being driven by said first pulse signal having a frequency f1.

10. Apparatus according to claim 6, in which f1 is substantially 1.5 times the frequency of f2.

* * * * *